Jan. 17, 1961 J. P. FAY 2,968,701

TRANSVERSE RECORDING DEVICE USING A TUBULAR TAPE MEDIUM

Filed June 26, 1956 2 Sheets-Sheet 1

INVENTOR.
James P. Fay
BY
Johnson and Kline
ATTORNEYS

Jan. 17, 1961 J. P. FAY 2,968,701

TRANSVERSE RECORDING DEVICE USING A TUBULAR TAPE MEDIUM

Filed June 26, 1956 2 Sheets-Sheet 2

INVENTOR.
James P. Fay
BY
Johnson and Kline
ATTORNEYS

United States Patent Office 2,968,701

Patented Jan. 17, 1961

2,968,701

TRANSVERSE RECORDING DEVICE USING A TUBULAR TAPE MEDIUM

James P. Fay, Norwalk, Conn., assignor to The Teletrak Corporation, Wilmington, Del., a corporation of Delaware Filed June 26, 1956, Ser. No. 593,919

13 Claims. (Cl. 179—100.2)

This invention relates to an apparatus for recording on a continuous flexible tape and more particularly to improvements on certain features of the invention disclosed and claimed in my copending application Serial No. 383,327, now Patent No. 2,809 238.

It is an object of the invention to provide an improved means for storing, supplying and handling the tape, feeding and supporting the same to recording position, and in storing the recorded tape.

Another object of the invention is to provide an improved mandrel for supporting the tape in recording position so as to take care of variations in tape thickness.

A still further object of the invention is to provide an improved means for mounting the recording head so as to maintain uniform pressure of the recording head with respect to the tape.

A still further object of the invention is to provide improved tracking or monitoring means whereby the relative movement between the recording head and tape is accurately controlled without the necessity of electrical connections to the rotor at the recording station.

Other objects of the invention will be apparent from the specification and claims when considered in connection with the drawings in which:

Figures 1, 2, 3, 4, 5:
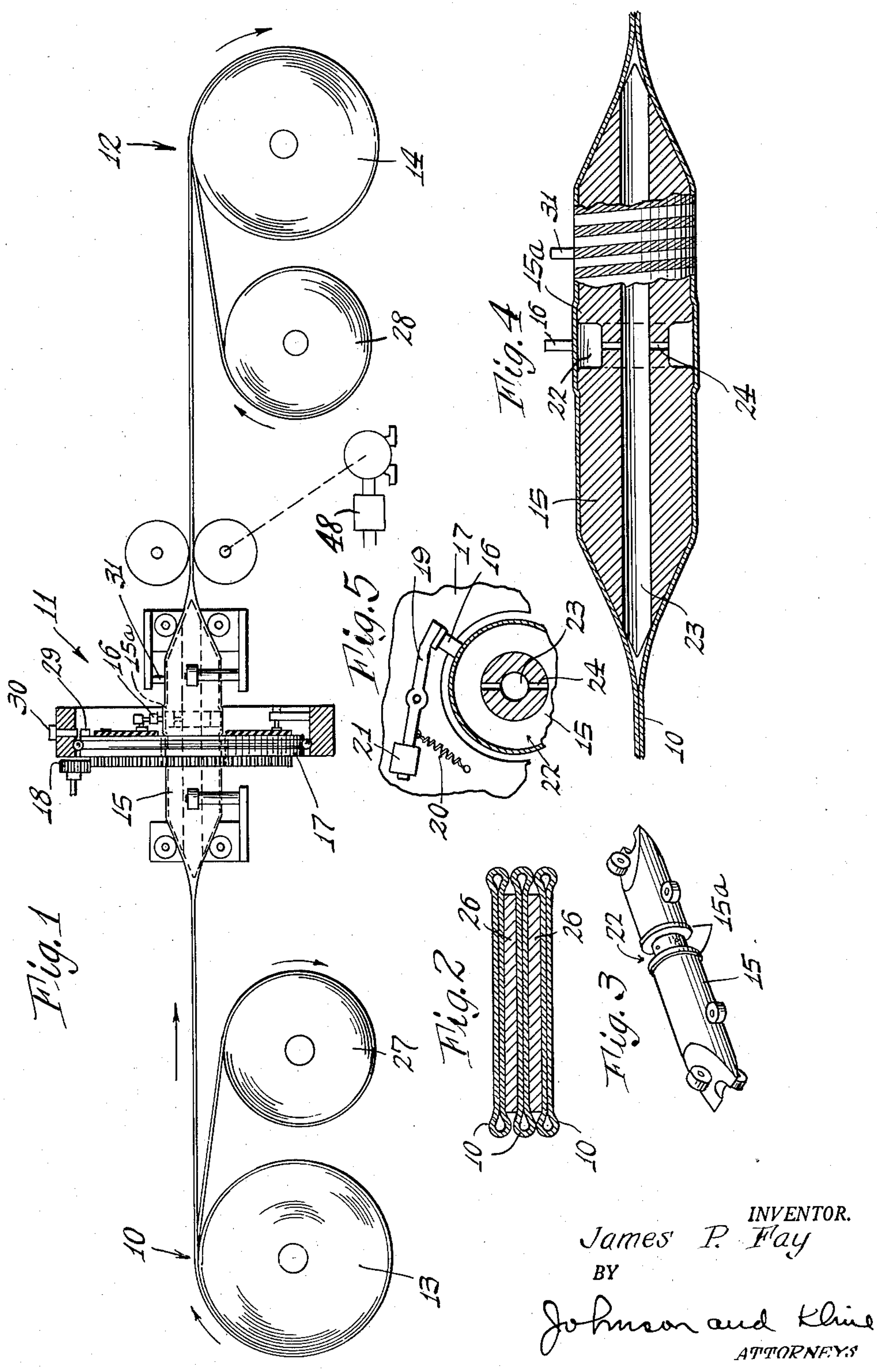
Figure 1 shows a diagrammatic view of the device of the present invention.
Fig. 2 is a sectional view taken through the stored tubular tape.
Fig. 3 is a perspective view of the expander device.
Fig. 4 is a longitudinal sectional view taken through the expander device showing the tape expanded thereon.
Fig. 5 is a fragmentary view showing the recording head mounted on the rotor at the loading station.
Figure 6:
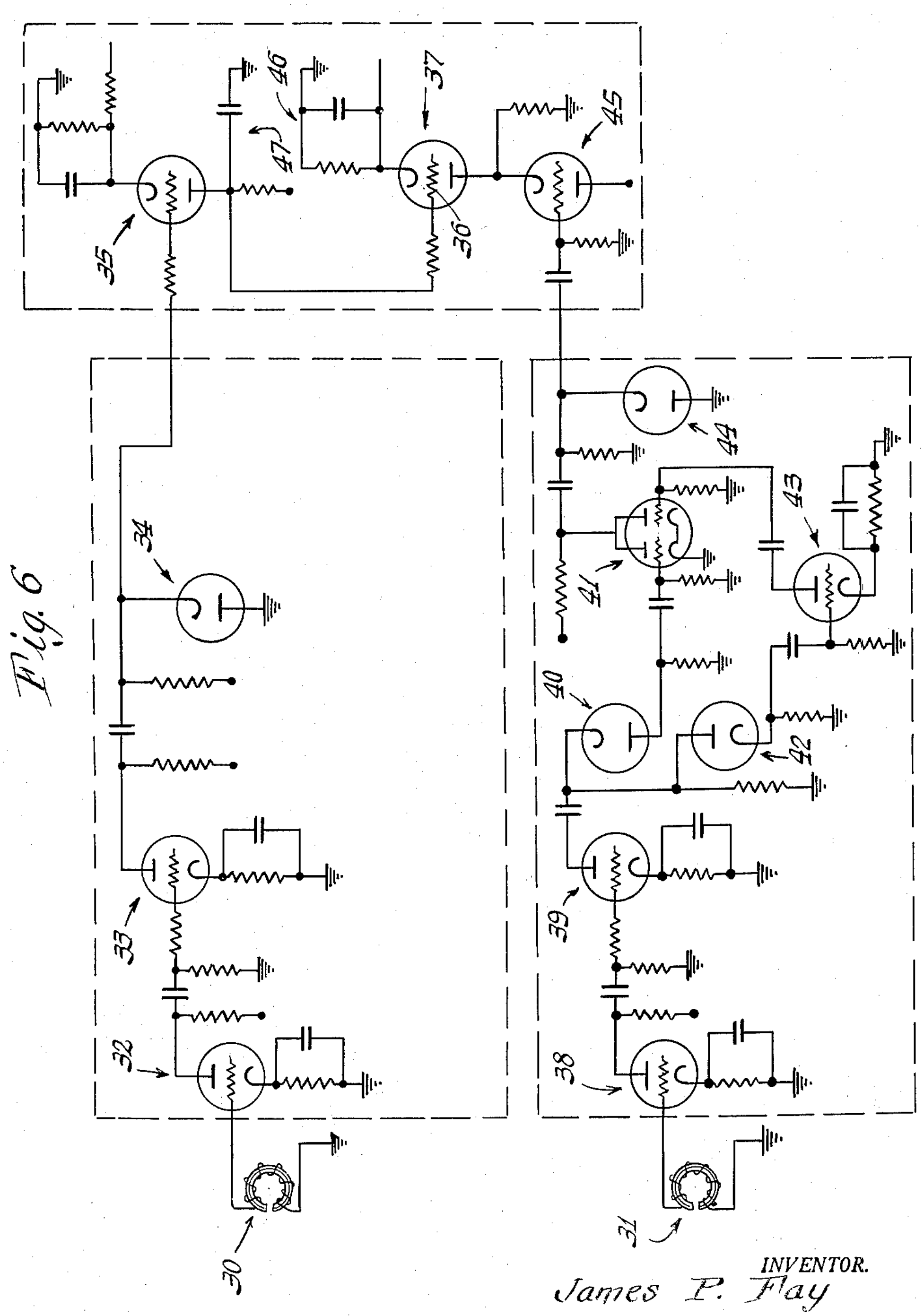
Fig. 6 shows a wiring diagram of the tracking of monitoring means for controlling the relative movement of the tape and recording head.

As is described and claimed in my copending application, a supply of tape 10 preferably formed as a continuous tubular member is provided and the tape is fed from the supply through a recording station 11 at which time it is supported in cylindrical form while a recording is made thereon. It is then fed to a take-up or receiver means 12 wherein the recorded tape is stored for use in reproducing the recording. For convenience in handling, the tape is flattened and wound on a storage reel 13 and a receiving reel 14. As the tape is fed through the recording station, it passes over a floating mandrel 15 which expands the tape into a true cylinder, the mandrel having a raised rib 15*a* at the recording point having an outer diameter substantially equal to that of the internal diameter of the tubular tape so as to support it in position to be engaged by a recording head 16 carried by a relatively high speed rotor 17 at the recording station driven by drive gearing 18.

In accordance with the present invention means are provided for controlling the pressure of the recording head on the tape during a recording operation. This means is best shown in Fig. 5 wherein an arm 19 is pivotally mounted intermediate its ends to the rotor 17 and has the recording head 16 secured to one end thereof to enable the head to move toward and away from the tape. The arm is normally retracted away from the tape by means of a spring 20 and the other end of the arm is provided with an adjustable weight 21 which is so adjusted that when the rotor is brought up to operating speed, centrifugal force will cause the weight to overcome the action of the spring and move the arm clockwise, as shown in Fig. 5, so as to carry the recording head into engagement with the surface of the tape with the required recording pressure. By properly proportioning the weight of the arm and spring, accurate recording head pressures can be obtained.

In order to compensate for slight variations in the wall thickness of the tape which, if supported on a rigid mandrel might cause the head to dig into the surface of the tape, the present invention provides for yieldingly supporting the tape in the recording position. As herein illustrated the expander is provided with an annular channel 22 which as shown in Fig. 4 is located centrally of the raised rib 15*a*, so that the tape stretched over the channel can yield under undue pressure of the recording head caused by variations in the thickness of the tape. If desired, the expander can be provided with a longitudinal bore 23 and the channel connected to the longitudinal bore by a plurality of passages 24. The channel is provided with an air pressure which will normally aid in supporting the tape in its expanded position as it passes thereover. However, should the wall of the tape be of an increased thickness, the head will cause the tape to be depressed into the channel, thus avoiding digging into the surface of the tape. It will be noted that the passages 24 between the channel and the central bore are relatively small so that they will act as dash pots to prevent undue movement of the tape as it may be flexed by the recording head and the pressure within the mandrel will quickly restore the tape to its expanded relation when the normal thickness of the wall of the tape is present.

In order to provide an air passage into the mandrel, to provide a balanced pressure therein the present invention has provided means whereby air may be supplied along the interior of tape. This is accomplished by providing spacer means between the turns of tape on the reel. Preferably the spacer means comprises a separate strip 26 of paper or other flexible material of substantial thickness and of a width less than the width of the tubular tape which is arranged as shown in Fig. 2 so that it lies inwardly of the edge of the flattened tape. This prevents the tape from being closed tightly at the fold and provides a bead forming an air channel extending completely throughout the tape to the expander. In addition to providing the air channel, it will be seen that the spacer prevents sharp creases at the edge of the tubular tape which might not be completely eliminated as the tape moves over the expander and would provide a slight projection at the point which might interfere with the recording. Furthermore, the spacer, when used with the receiver or take-up roll will prevent cross-printing or offset printing of the recordings between the adjacent layers of recording tape.

While the spacers may be handled in any suitable fashion, it is at present preferred to provide a reel 27 adjacent the supply reel to take-up the spacer strip as it leaves the unwinding supply reel and to have a supply 28 of spacer strip adjacent the receiver or take-up reel 12 for the tape, which strip is adapted to be fed into the take-up roll as the recorded tape is fed thereto so as to be positioned between the turns of tape, as shown in Fig. 2, to provide an air passage, prevent creasing of the edges of the tape and prevent offset printing of the recording as between turns on the reel.

In order to control the movement of the tape with respect to the recording head without requiring electrical connections to the rotor, the present invention provides the rotor with an Alnico magnet 29 or other equivalent magnetic device and mounts a pickup head 30 on the stator so that a predetermined time in each rotation of the rotor a pulse or signal will be picked up by the pickup head. The frame is also provided with a pickup head 31 having a narrow gap and which is positioned adjacent the recorded tracks on the tape as shown in Figs. 1 and 4 so that as the recorded tape is moved past the second pickup head it will pickup a positive or negative pulse or signal of varying amplitude, depending upon the polarity of recording at the time. By comparing the pulses produced by the rotation of the rotor and the pulses produced by the tape, a proper spacing of the recording on the tape can be maintained.

One method of controlling the relative rate of feed of the tape with respect to the rotation of the head so as to provide the properly spaced recordings on the tape, is illustrated herein wherein the pulse or signal received from the rotor pickup head 30 is fed through an amplifier 32 to a clipper circuit 33 and is connected to a D.C. restorer tube 34 so as to impress a positive wave form on the grid of the saw tooth wave generator 35, the resultant generated voltage being applied to the grid 36 of the three element sampler tube 37. The signal is picked up by the pickup head 31 adjacent the recorded tubular tape as the recorded lines pass thereby, is fed through an amplifier 38 to a clipper circuit 39. The negative pulses are fed to a D.C. restorer tube 40 and then to a mixer tube 41. The positive pulses are fed from the clipper circuit to the D.C. restorer tube 42 through an inverter circuit 43 to the mixer tube 41. The output of the mixer tube is connected to a D.C. restorer 44 and provides a plurality of pulses to the grid of the plate modulator tube 45 which is connected to the sampler tube to supply voltage to the plate thereof. The sampler tube is connected to a resistance condenser circuit 46 having a long time constant as compared to the time constant of the R.C. charging circuit 47 in the saw tooth generator, and the voltages produced by the plate modulator then produce, in conjunction with the voltages produced by the saw tooth wave generator, a comparative output having a definite relation when the head and tape are in proper position. The output from the sampler tube is fed to the servo control for the feed means to maintain the predetermined tape speed-rotor speed relation. Should the recorded lines for some reason become improperly spaced, the signal picked up thereby would vary the pulses applied to the modulator tube which in turn would vary the energization of the sampler tube with relation to the saw tooth wave applied to the grid thereof and vary the output of the sampler tube which would control the servo control 48 for the feed motor to increase or decrease the speed of the tape in order to restore a balanced and proper condition between the rotating head and the longitudinal travel of the tape to provide the properly spaced recording lines on the tape.

While the present invention has been described in connection with a recording device, it is to be understood that the structure can be utilized for reproducing recordings which have been previously recorded on the tubular tape since it merely involves feeding the recorded tape to a play-back unit similar to the recording unit described herein, picking up the signal by the recording head from the tape as it is expanded into cylindrical form, and then taking up the recorded tape after the recording has been reproduced therefrom. The monitoring system will function in the same manner to control the relative rate of speed between the tape and the pickup head so as to insure true reproduction of the recording.

Variations and modifications may be made within the scope of the claims and portions of the improvements may be used without others.

I claim:

1. In a recording device, a reel having a continuous, flattened, tubular, flexible member wound thereon, said member having a magnetizable material on the outer surface; a spacer strip disposed between the turns of the tubular member wound on the reel and spaced inwardly from the edges thereof; means feeding the tubular member from the reel past a recording station; expanding means at the recording station disposed within the member and having longitudinally spaced member engaging portions located in recording position and engaging and expanding said tubular member into a cylinder while passing through the recording position at said station; means mounting a recording device, including a head, in recording position for rotation about the axis of the tubular member to produce a spiral magnetized track on the magnetizable surface in accordance with the energization of said recording device; said recording device including means for regulating the pressure of said head on the tubular member, the portion of the tube extending between said spaced engaging portions being yieldably supported thereby to prevent undue pressure thereon during recording; means monitoring said track on the tubular tape; means actuated by said monitoring means for controlling the relative movement of the tape and recording device to properly space the track thereon; a take-up reel for winding up the flat tubular member after said member passes the recording device; and a supply of spacer strip adjacent the take-up reel to be fed onto the reel and be disposed between the turns of the tubular member as the member is wound thereon.

2. In a recording device, means supplying a continuous flexible member, said member having a recording material thereon; means feeding the member from the supply past a recording station; means at the recording station for supporting the member in cylindrical form to produce a tubular member while passing through the recording station; means mounting a recording device for rotation about the axis of the tubular member to produce a spiral recorded track on the tubular member in accordance with the energization of said recording device; said means comprising a rotor, an arm pivotally mounted on the rotor to move the recording device toward or away from the member, means normally urging the recording device away from said member, and weight means on the arm responsive to rotation of the rotor for moving the recording device into contact with the member with a predetermined surface pressure at normal operating speed of the rotor.

3. In a recording device, means supplying a continuous flexible member, said member having a magnetizable material on the outer surface; means feeding the member from the supply past a recording station; means at the recording station for supporting the member in cylindrical form to produce a tubular member while passing through the recording station; means mounting a recording device for rotation about the axis of the tubular member to produce a spiral magnetized track on the magnetizable surface in accordance with the energization of said recording device; said means comprising a rotor surrounding the member, an arm pivotally mounted on the rotor to move the recording device toward or away from the member, spring means normally urging the recording device away from said member, and weight means on the arm responsive to rotation of the rotor for moving the recording device into contact with the member with a predetermined surface pressure at normal operating speed of the rotor.

4. In a recording device, a supply of continuous, flexible tape having recording material thereon; means feeding the tape from the supply past a recording station; means at the recording station having longitudinally spaced tape engaging portions supporting the tape at spaced points and defining a recording position, said portions alone holding said tape in a single ply cylinder having a continuous cylindrical surface free of overlapped portions to produce a tubular member while passing through the recording position; means mounting a recording device in recording position for rotation about the axis of the tubular member to produce a spiral recorded track on the tape in accordance with the energization of said recording device, the tape supported between said spaced tape engaging portions being deflectable under the pressure of the recording device during the recording operation to prevent undue pressure on the tape.

5. In a recording device, a supply of continuous, flat, flexible tape, said tape having recording material thereon; means feeding the tape from the supply past a recording station; means at the recording station having longitudinally spaced raised tape engaging portions located in a recording position said portions alone engaging and holding said tape in a single ply cylinder having a continuous cylindrical surface free of overlapped portions to produce a tubular member while passing through the recording position; means mounting a recording device in recording position for rotation about the axis of the cylinder to produce a spiral recorded track on the tape in accordance with the energization of said recording device, the tape supported between said spaced tape engaging portions being deflectable under the pressure of the recording device during the recording operation to prevent undue pressure on the tape.

6. In a recording device, a supply of continuous, flattened, tubular, flexible tape, said tape having recording material thereon; means feeding the tape from the supply past a recording station; expanding means at the recording station disposed within the tape and having a circumferential channel therein providing longitudinally spaced tape engaging portions located in a recording position, said portions engaging and expanding said tape into a cylinder while passing through the recording position; means mounting a recording device in recording position for rotation about the axis of the cylinder to produce a spiral recorded track on the tape in accordance with the energization of said recording device, the tape supported between said spaced tape engaging portions and over the channel being deflectable under the pressure of the recording device during the recording operation to prevent undue pressure on the tape.

7. In a recording device, a supply of continuous, flattened, tubular, flexible tape, said tape having recording material thereon; means feeding the tape from the supply past a recording station; expanding means at the recording station disposed within the tape and having a longitudinal bore and a circumferential channel in the outer surface providing longitudinally spaced tape engaging portions located in a recording position and engaging and expanding said tape into a cylinder while passing through the recording position; means mounting a recording device in recording position for rotation about the axis of the tubular member to produce a spiral recorded track on the tape in accordance with the energization of said recording device, the tape supported between said spaced tape engaging portions being deflectable under the pressure of the recording device during the recording operation to prevent undue pressure on the tape, said channel being connected to the bore by restricted passages for controlling the movement of the tape during deflection thereof.

8. In a recording device, a supply reel having a continuous, flattened, tubular, flexible member wound thereon, said member having a recording material thereon; a spacer strip disposed between the turns of the tubular member wound on the reel and spaced inwardly of the edges thereof; means feeding the tubular member from the reel past a recording station; means receiving the spacer strip as the reel unwinds; means at the recording station disposed within the member and expanding said tubular member into a cylinder while passing through the recording station; means mounting a recording device for rotation about the axis of the tubular member to produce a spiral recorded track on the member in accordance with the energization of said recording device; a take-up reel for winding up the flat tubular member after said member passes the recording device; and a supply of spacer strip disposed adjacent the take-up reel and adapted to be wound thereon between the turns of the tubular member and spaced inwardly of the edges thereof, the edges of the tubular member on the supply reel and take-up reel extending beyond the edges of the spacer strip the projecting edges of the tubular member forming a hollow bead therealong whereby creasing of the member on the supply reel and take-up reel is prevented.

9. In a recording device, a supply reel having a continuous, flattened, tubular, flexible member wound thereon, said member having a recording material thereon; a spacer strip disposed between the turns of the tubular member wound on the reel and spaced inwardly of the edges thereof; means feeding the tubular member from the reel past a recording station; means receiving the spacer strip as the reel unwinds; means at the recording station disposed within the member and expanding said tubular member into a cylinder while passing through the recording station, said means including an annular channel disposed under the member in recording position to yieldably support said member; means mounting a recording device for rotation about the axis of the tubular member to produce a spiral recorded track on the tubular member in accordance with the energization of said recording device; a take-up reel for winding up the flat tubular member after said member passes the recording device; and a supply of spacer strip disposed adjacent the take-up reel and adapted to be wound thereon between the turns of the tubular member and spaced inwardly of the edges thereof, the edges of the tubular member on the supply reel and take-up reel extending beyond the edges of the spacer strip forming a hollow bead therealong, said bead being in fluid communication with said channel whereby fluid pressure in said channel is maintained.

10. In a recording device, a supply reel having a continuous, flattened, tubular, flexible member wound thereon, said member having a recording material thereon; a spacer strip disposed between the turns of the tubular member wound on the reel and spaced inwardly of the edges thereof; means feeding the tubular member from the reel past a recording station; means receiving the spacer strip as the reel unwinds; means at the recording station disposed within the member and expanding said tubular member into a cylinder while passing through the recording station; means mounting a recording device for rotation about the axis of the tubular member to produce a spiral recorded track on the tubular member in accordance with the energization of said recording device; and means for taking up the flat tubular member after said member passes the recording device, the edges of the tubular member on the supply reel extending beyond the edges of the spacer strip forming a hollow bear therealong whereby creasing of the tubular member is prevented.

11. In a recording device, a reel having a continuous, flattened, tubular, flexible member wound thereon, said member having a magnetizable material on the outer surface; means feeding the tubular member from the reel past a recording station; means at the recording station disposed within the member and expanding said tubular member into a cylinder while passing through the recording station; means mounting a recording device for rotation about the axis of the tubular member to produce a spiral magnetized track on the magnetizable surface in accordance with the energization of said recording device; means for monitoring the position of said track on the tubular member including means producing a signal responsive to the rotative movement of said recording head and means producing a signal responsive to the longitudinal movement of said track; means actuated by said signals in the monitoring means for controlling the relative movement of the member and recording device to properly space the track thereon; and a take-up reel for winding up the flat tubular member after said member passes the recording device.

12. In a recording device, a supply of flexible tape wound thereon and having a magnetizable material on the surface; means feeding the tape from the supply past a recording station; means at the recording station to support said tape in position to receive a recording thereon; means including a frame and a rotor rotatably carried thereby for mounting a recording device for movement transverse to the longitudinal axis of the tape to produce a magnetized track on the magnetizable surface in accordance with the energization of said recording device; means for monitoring the position of said track on the tape including a pickup head on the frame and a cooperating magnet on the rotor for producing a signal for each rotation of said rotor responsive to the rotative position of the recording device and means comprising a pickup head on the frame to produce a signal in response to the movement of the magnetized track thereby, electronic means for converting said first signal into a grid voltage having a saw tooth wave form and for converting the second signal into a pulsating plate voltage, and a three element output tube controlled by said grid and plate voltages for controlling the relative movement of the tape and recording device to properly space the track thereon; and a take-up for the recorded tape.

13. In a recording device, a supply of flexible, tubular tape having a magnetizable material on the surface; means feeding the member from the supply past a recording station; means at the recording station to expand said tape into cylindrical form to receive a recording thereon; means including a frame and a rotor rotatably carried thereby for mounting a recording device for rotation about the longitudinal axis of the tape to produce a magnetized track on the magnetizable surface in accordance with the energization of said recording device; means for monitoring the position of said track on the tape including a pickup head on the frame and a cooperating magnet on the rotor for producing a signal for each rotation of said rotor responsive to the rotative position of the recording device and means comprising a pickup head on the frame to produce a signal in response to the movement of the magnetized track thereby, electronic means for converting said first signal into a grid voltage having a saw tooth wave form and for converting the second signal into a pulsating plate voltage, and a three element output tube controlled by said grid and plate voltages for controlling the relative movement of the tape recording device to properly space the track thereon; and a take-up reel for winding up the recorded tubular tape.

References Cited in the file of this patent

UNITED STATES PATENTS

| | | |
|---|---|---|
| 2,343,114 | Neumann | Feb. 29, 1944 |
| 2,714,133 | Barry | July 26, 1955 |
| 2,773,120 | Masterson | Dec. 4, 1956 |
| 2,866,012 | Ginsburg | Dec. 23, 1958 |
| 2,876,295 | Irby | Mar. 3, 1959 |
| 2,912,518 | Maxey | Nov. 10, 1959 |